United States Patent [19]

Buchanan

[11] 4,196,694

[45] Apr. 8, 1980

[54] ARTIFICIAL REEF ELEMENTS AND METHOD OF DEPLOYING SAME

[76] Inventor: Robert R. Buchanan, 340 Rosewood Ave., San Jose, Calif. 95117

[21] Appl. No.: 876,224

[22] Filed: Feb. 9, 1978

[51] Int. Cl.² .......................... A01K 61/00; E02B 3/04
[52] U.S. Cl. .......................................... 119/3; 119/4; 405/16
[58] Field of Search .................... 119/2, 3, 4; 405/16, 405/22–30

[56] References Cited

U.S. PATENT DOCUMENTS

| | | | |
|---|---|---|---|
| 3,347,210 | 10/1967 | Golub | 119/4 |
| 3,675,626 | 7/1972 | Down | 119/4 |
| 3,685,490 | 8/1972 | Adams | 119/4 |
| 3,928,701 | 12/1975 | Roehner | 405/16 X |
| 4,095,560 | 6/1978 | Laurie et al. | 119/3 |

*Primary Examiner*—Hugh R. Chamblee
*Attorney, Agent, or Firm*—Allston L. Jones; David A. Boone

[57] ABSTRACT

A method of construction of an artificial reef with individual reef elements manufactured from recycled or new materials. Each reef element is constructed, for example, from used tire casings which are cut in one of several different ways. One type of reef element is constructed by cutting a tire casing longitudinally along its tread area leaving a single small web area at one side short of the tire being completely severed into individual loop segments, or a pair of webs on opposite sides of the tread. Tire casings cut in this way are then fanned open and attached to one of two types of bases. The second and third types of reef elements are constructed from several side walls or half tires, also mounted on one of the two types of bases. Enumerable other reef element configurations are possible by cutting the tire casings in other ways. A method of deployment of the various reef element types is discussed to provide protection for various size fish, from the small fry to the fingerling to the average market size.

10 Claims, 15 Drawing Figures

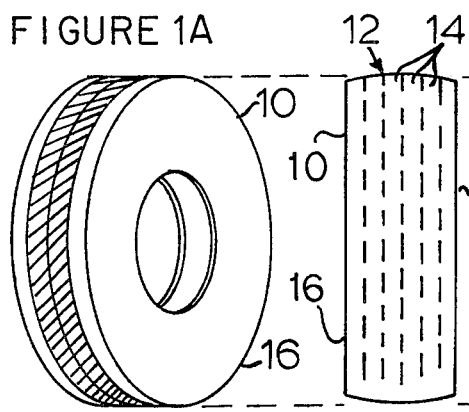
FIGURE 1A
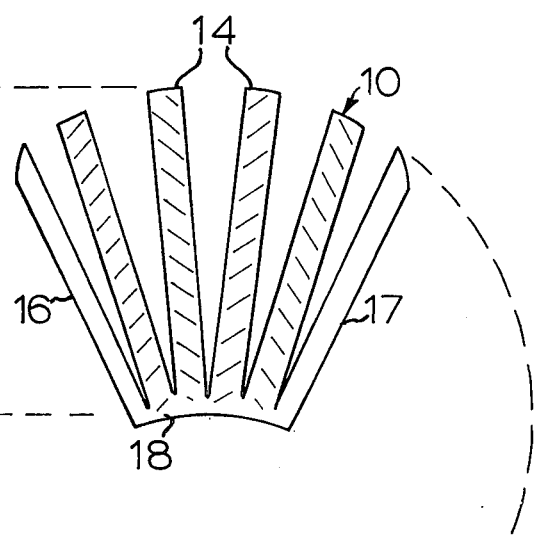
FIGURE 1B
FIGURE 1C
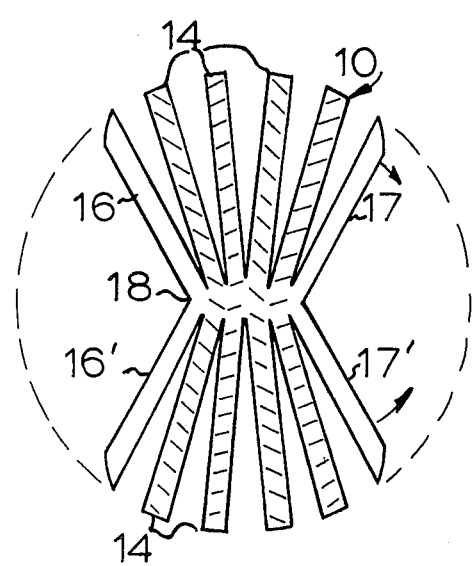
FIGURE 1D

ARTIFICIAL REEF ELEMENTS AND METHOD OF DEPLOYING SAME

BACKGROUND OF THE INVENTION

During the past several decades, a considerable amount of research has been done into ways to increase the supply of both sport and commercial fish in the oceans, lakes and streams in this country, as well as other countries. One approach is fish hatcheries. In these hatcheries, conditions for breeding, hatching and growing and maintained as close to ideal as possible to insure a yield of small adult fish which is several times greater than the yield that would occur naturally. This approach, while it is a workable one, is very costly. It requires special breeding tanks, and numerous holding tanks to keep the small fish separated from the larger ones, as well as their other natural enemies. It also requires that the fish be fed a special diet, that the tanks be cleaned periodically, and that the small adult fish then be transported to the ocean, lake or stream where they are to be transplanted.

The second approach which has been successful is the construction of artificial reefs. It is widely known that fish congregate in those areas where food and shelter from predators are abundant. The areas that fish naturally seek are ocean reefs, seaweed beds, grassy areas, rocky areas, etc. However, these features are not available everywhere, and without these natural habitats for plants and animals, the bottoms of lakes, deltas and shallow coastal areas are virtual deserts.

Through the use of artificial reefs, the "virtual deserts" can be converted to fish havens and breeding grounds. By proper location selection, artificial reefs will not present the problems to navigation that natural reefs often do, and it has been shown that they very quickly lend themselves to aquaculture and resource management. Many different materials have been tired in the formation of artificial reefs, some more successfully than others. These materials include old car bodies, sunken ships, precast cement fish houses, building rubble, piles of rocks, and old tires. All of these materials make long lasting reefs with the exception of the old car bodies and the streetcars which collapse from corrosion within 3-5 years. Additionally, each of these materials has a high material cost and/or a high shipping and handling cost due to their bulkiness and weight, with one exception—old tires.

Old tires are chemically inert in sea water and will last indefinitely. Unfortunately, old tires if used individually, tend not to be very effective. They either float because air is trapped in the casing, or, if they are weighted with a rock or concrete, they tend to lie flat on the bottom and become covered and filled with silt, greatly reducing their usefulness. To overcome this problem, tires are usually fastened together in bundles or stacks, laid flat and bolted together, tethered together between two posts driven into the ocean floor, or precasted into a concrete block with other tires. (For a further discussion of these ideas, see Fishery Facts—1-0—How to Build Marine Artificial Reefs, National Oceanic and Atmospheric Administration, 1974, No. 0320-00091, and Fish Havens, Norman W. Edmund, Big Trees Press, Felton, Ca 95018, 1967.). Each of these configurations is bulky and quite heavy, requiring the use of expensive equipment and divers to manipulate and implace the elements of the reef.

To overcome these problems, it would be desirable to have reef elements which are lightweight and easily handled by one person to implace without expensive equipment or divers. It would also prove very advantageous for each of the reef elements to be self-righting and self-anchoring to minimize the number of elements which become ineffective. The present invention provides these advantages.

SUMMARY OF THE INVENTION

The present invention consists of several types of artificial reef elements and their method of manufacture, and the method of deploying these reef elements to form an artificial reef.

One type of artificial reef element of the present invention is constructed by first cutting a tire casing longitudinally along its tread leaving at least on web segment to hold each of the resultant cut sections together. Next, the two end most sections (e.g., the sidewalls) of the cut tire casing are fanned out and fastened to each other forming a starlike structure of connected loops. One could include more than a single cut tire casing by fastening the outer most section of one to the outer most section of the next tire with the web segments of each adjacent to each other until they form a circular, starlike structure. The starlike structure is then connected to a weighted base by means of nuts and bolts, a strong adhesive, flexible cord or wire, or a clamp. This structure can also be formed from other types of materials, (e.g., plastic pipe) by the same type of partial longitudinal cuts and fan-out procedure, or by cutting individual loops which are then tied together in a starlike fashion.

A second type of reef element is a modification of the first. This type of element consists of the first type with at least one smaller diameter cut tire casing nested within the larger starlike structure, each of which is also fanned out in a similar starlike fashion.

The third and fourth type reef elements each are constructed from large washer-shaped sections, tire casing sidewalls, or half tire casings mounted on a weighted base. The third type of reef element consists of a spaced-apart stack of the washer-shaped or tire casing sections. In the fourth reef element type, at least two of the washer-shaped or tire casing sections are overlapped and fastened together in a polyhedron with the tops of the washer sections brought together to limit the size of the top opening of the completed reef element. This polyhedron structure is then fastened to a weighted base to complete the reef element.

Additional types of reef elements are possible by cutting tire casings in other ways. For example, by making one continuous cut along the surface of the tread from one sidewall to the other as the tire is rotated several times (i.e., the cut is slightly offset from being perpendicular to the loci of points within the tire which are equidistant from the tread surface, say by 5°), the tire casing will take the shape of a multi-loop spiral. This spiral can then be attached to a base in a longitudinally stretched form or a circularly stretched form.

Two weighted bases for use with the above-discussed reef elements include a precast concrete base and a weighted tire casing. The concrete base has a tubular center section and a broad flange section at one end to give the resultant reef element a low center of gravity. Also, the flange optionally includes studs cast in the concrete. The weighted tire casing also includes several optional studs protruding through one of its sidewalls. The weights for this base are of precast concrete made to fit within the interior of the tire casing formed by the tread and the sidewall portions of the tire casing. Cast into each of these concrete weights is a flexible trying means, the ends of which are wrapped around the outer surface of the tire casing and then fastened together such as by tying or twisting, etc.

Once the desired types of reef elements are constructed, one person can deploy them in the desired location from a slow-moving boat or barge. This is possible since the various elements are relatively light weight, since each tire casing is made to protect a volume of water that is equivalent to the volume that five or six uncut tire casings would protect in the prior art configurations. Also, the final pattern of the finished reef is easily controlled by steering the boat in the same pattern directly above the selected locations of each reef element. This is possible since each type of reef element discussed above is self-righting as a result of their lower center of gravity. In addition, each reef element is self-anchoring which, in addition to the self-righting feature, makes it possible to construct the reef without the need for a diver to place and anchor each reef element.

DESCRIPTION OF THE DRAWINGS

FIGS. 1a, b, c and d show the marking and two methods of cutting of tire casings to form one type of the reef elements of the present invention.

DESCRIPTION OF THE PREFERRED EMBODIMENT

Figure 2A:
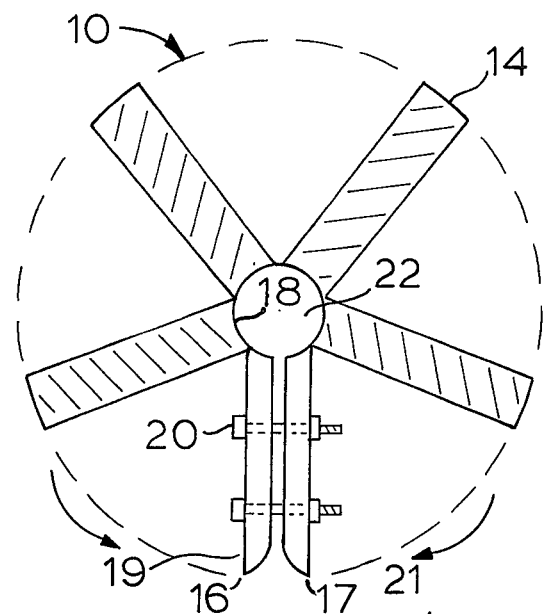
FIGS. 2a, b, and c show a top view of opened and fastened tire casings cut as shown in FIGS. 1c and d to form one type of the reef elements of the present invention.

In FIG. 1, the first steps of construction of a reef element of the instant invention are shown. FIG. 1a shows a perspective view of a tire casing. Then in FIG. 1b, tire casing 10 is shown having its tread area 12 marked for cutting longitudinally parallel to sidewalls 16 and 17 into a plurality of sections 14. In the process of cutting tire casing 10 into sections 14, each cut is stopped short of completely severing each of sections 14 from each of the others. This results in each of sections 14 being nearly circular and connected, one to the other by web 18.

FIG. 1d shows an alternative way of cutting tire casing 10 longitudinally into a plurality of sections 14. If this approach is utilized, tire casing 10 is cut longitudinally along tread 12 parallel to sidewalls 16 and 17 to a point nearly in the center of tire casing 10 from opposite sides. This results in each of sections 14 and 14' being nearly semi-circular and connected one to the other by two webs 18 which are directly opposite each other on tread 12.

FIGS. 2a, b and c each show how to maintain sections 14 of a cut tire casing 10 in a fanned-open-star shape. In FIG. 2a, a single tire casing 10 cut as discussed in relation to FIG. 1c is opened by pulling sidewalls 16 and 17 counter clockwise and clockwise, respectively (see arrows in FIGS. 1c and 2a) until they meet. Once sidewalls 16 and 17 are brought together, they are fastened together with bolts 20, with a strong, fast-setting adhesive such as cyanoacrylate, or with a strong rope passed through the center of sections 19 and 21 and tied around them. Once sidewalls 16 and 17 are fastened together, a center hole 22 is formed by web 18 drawn substantially into a circle.

Figure 2B:
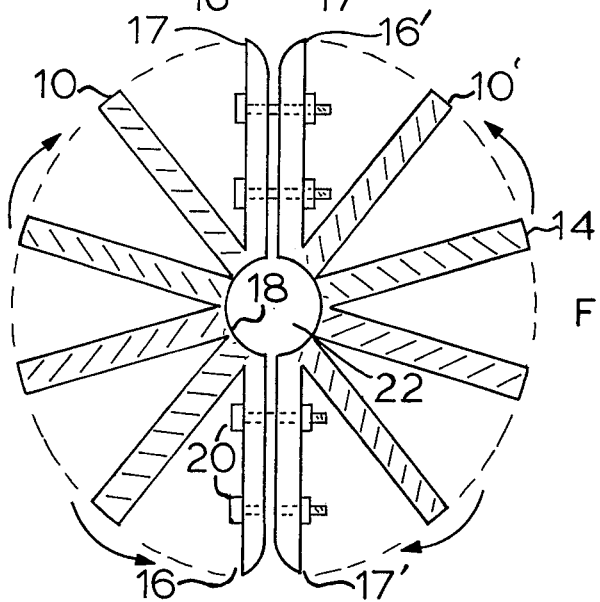

FIG. 2b shows the fastening together of two tire casings 10 and 10' to form the fanned-out arrangement of sections 14 when each of their sidewalls are pulled open in the direction of the arrows. This is achieved by fastening sidewall 16 of tire casing 10 to sidewall 17' of tire casing 10', and fastening sidewall 16' of tire casing 10' to sidewall 17 of tire casing 10 to form substantially a continuous circle of sections 14. Again, the sidewalls 16 and 17 are fastened together with bolts 20, with a strong adhesive, or with a strong rope tied through each pair of sidewall sections. In this configuration, tire casings 10 and 10' also form a center hole 22 formed by webs 18 and 18' each being drawn substantially into a semi-circle. While this figure only shows the structure formed from two longitudinally cut tire casings 10, it is clear that any number of tires can be interconnected in this manner, however, if too many tire casings are used, the final structure will be very bulky and heavy.

Figure 2C:
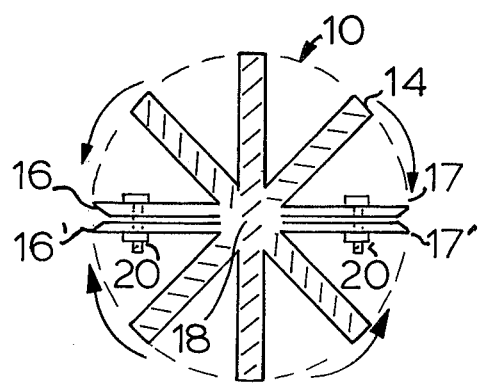

FIG. 2c shows a similar method of opening up of tire casings 10 which have been cut as discussed in relation to FIG. 1d. To produce this configuration, sidewall halves 16 and 16' are pulled together in the direction of the arrows and fastened in place by any of the methods discussed above, as are sidewall halves 17 and 17'. In this configuration, since webs 18 are in the center of tread 12 of tire casing 10, instead of on one edge as in FIG. 1c, there is no hole formed in the center when sections 14 have been fanned out.

Figure 3:
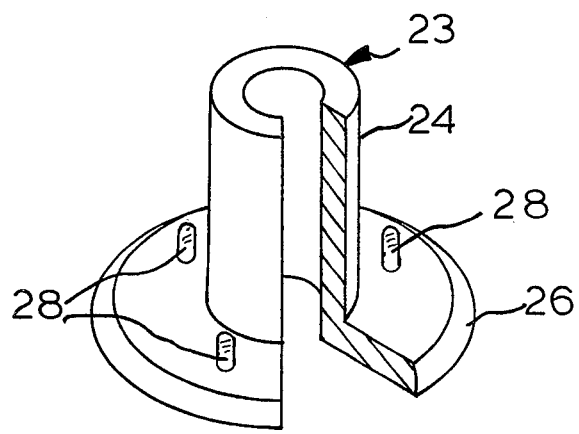
FIG. 3 shows a partial cut-away perspective view of a precast concrete base for the reef elements shown in FIGS. 2a and b.

The next step is to fasten the fanned-out reef element configurations of FIGS. 2a, b and c to a base to insure that each of these elements, when dropped overboard will be self-righting and will stay in place when they reach the bottom. FIG. 3 shows a partial cutaway perspective view of a precast concrete base 23. Base 23 has a thin wall tubular center section 24 with a broad flange section 26 at one end to give base 23 a low center of gravity. Cast into flange 26 are optional threaded studs 28.

Figure 4A:
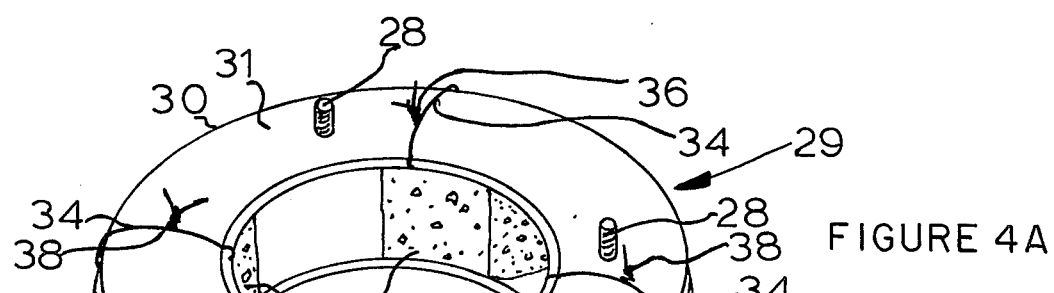
FIG. 4 shows a perspective view of a base for each of the types of reef elements of the present invention.

FIGS. 4a and b show a second base configuration for the above-discussed reef elements. Base 29 consists of an uncut tire casing 30 into which several precast concrete weights 32 have been placed. Embedded into precast concrete weights 32 are flexible attaching means 34. Flexible attaching means 34 may be any suitable strong formable material, such as heavy wire, or nylon or polyester cord, which will withstand deterioration under water. To retain weights 32 in place within tire casing 30, the ends of flexible attaching means 34 are wrapped around tire casing 30 with one end passing over each of tire beads 36 and being fastened together on the outer surface of tire casing 30 at 38. Optional studs 28 are also shown protruding through sidewall 31 which will become the top side of base 29.

Figure 5:
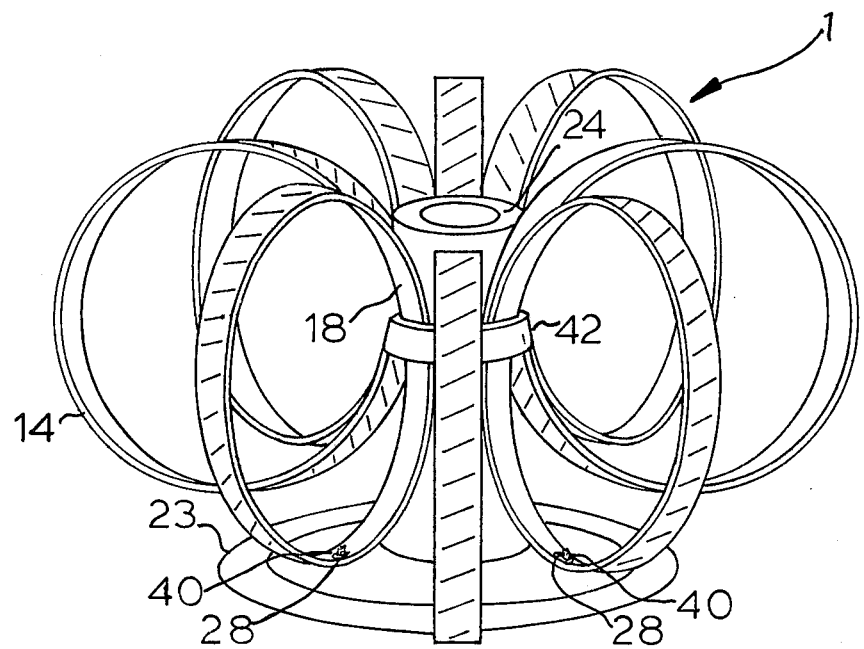
FIG. 5 is a perspective view of a fully assembled reef element of the type shown in FIGS. 2a and b attached to the type of base shown in FIG. 3.

A fully assembled reef element of the first type utilizing base 23 is shown in FIG. 5. A fanned-out tire casing 10 having a center hole 22 formed therein by web 18 (see FIGS. 2a and b) is slipped over the tubular center section 24 of base 23. The fanned-out tire casing 10 is also shown fastened to base 23 by two means, either of which is sufficient by itself to hold tire casing 10 to base 23. One means for fastening fanned-out tire casing 10 to base 23 is by cutting a hole in the loop sections 14 which are nearest studs 28, placing those sections over studs 28, and tightening nuts 40 down on studs 28. The second means of attachment is with a clamp 42 around the region of web 18 of casing 10 which encircles center section 24 of base 23.

Figure 4B:
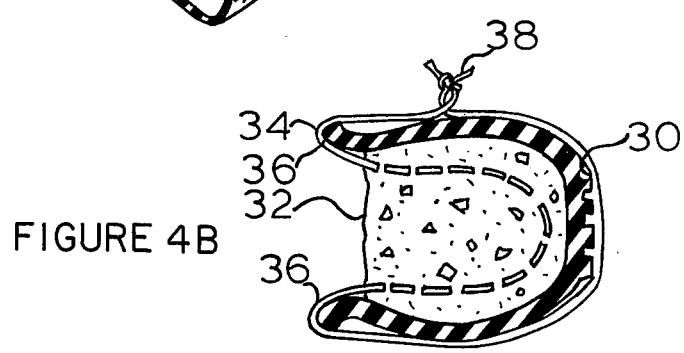
Figure 6:
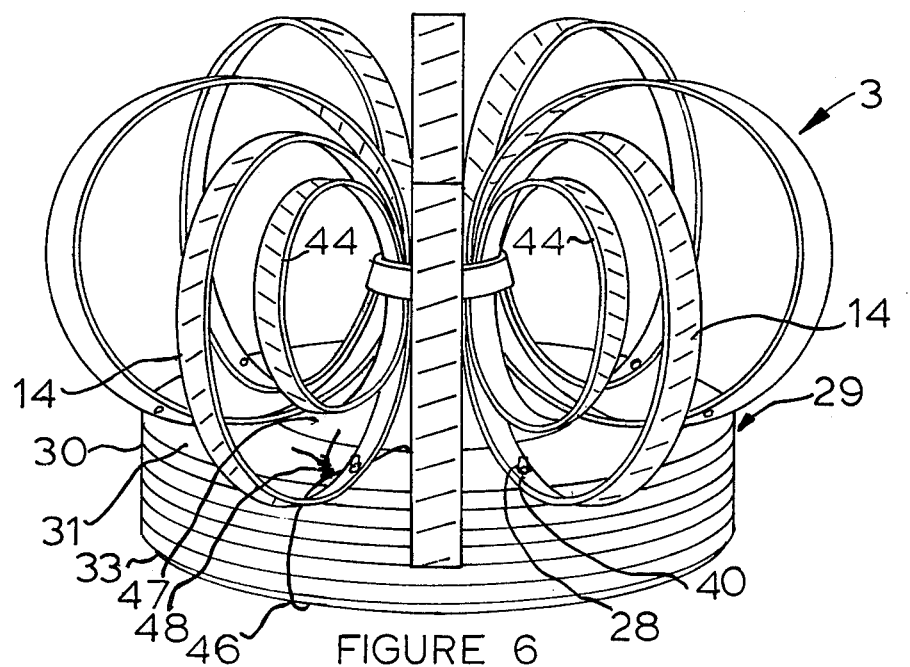
FIG. 6 is a perspective view of a fully assembled reef element of the type shown in FIGS. 2a, b and c attached to the type of base shown in FIG. 4.

Represented in FIG. 6 is an assembly of one of the first type of reef elements 3 which utilizes base 29 as discussed in relation to FIG. 4. With base 29, any of the fanned-out tire casing 10 configurations discussed in relation to FIGS. 2a, b and c can be utilized. Here, three ways of fastening fanned-out tire casing 10 are shown. First, there is the bolting of selected loop sections 14 to base 29 by means of studs 28 and nuts 40. Second, there is the fastening of selected loop sections 14 to base 29 with flexible attaching means 46. This is accomplished by passing one end of flexible attaching means 46 through the selected loop section 14, then that same end is passed over sidewall 31 and through center hole 48 of tire casing 30, brought under sidewall 33 and connected to its other end by twisting or tying at 47. The same type of material as was discussed for tying the sidewalls of tire casings 10 together in relation to FIGS. 2a, b and c can be utilized here. Third, there is clamp 42 as discussed in relation to FIG. 5, however, this approach is only available for tire casings 10 configured as discussed in relation to FIGS. 2a and b.

Also shown in FIG. 6 is a second tire casing of a smaller diameter than tire casing 10. This smaller diameter tire casing is also cut as described in relation to FIG. 1c and has been fanned out and fastened within loop sections 14 of larger tire casing 10 as described in relation to FIG. 2a or b. When this approach is utilized, it is still possible to fasten the combined fanned-out tire casings to base 29 by any of the above-discussed means. Of course, this approach is not limited to a single smaller fanned-out tire casing within a larger tire casing; any number of ever-smaller tire casings can be fanned out and fastened within the larger diameter tire casings. It is possible to include fanned-out tire casing 10 of a smaller diameter within this configuration if tire casings 10 are all cut as described in relation to FIG. 1c or d without mixing the two, or if all but the innermost tire casing 10 is cut as in FIG. 1d. If tire casings 10 cut as in FIG. 1d are nested, then the various loop sections 14 must be tied or bolted together, since there is no central post-like member formed by webs 18 when the tire casing 10 is fanned open as there is for tire casings 10 cut as shown in FIG. 1c.

Figure 7:
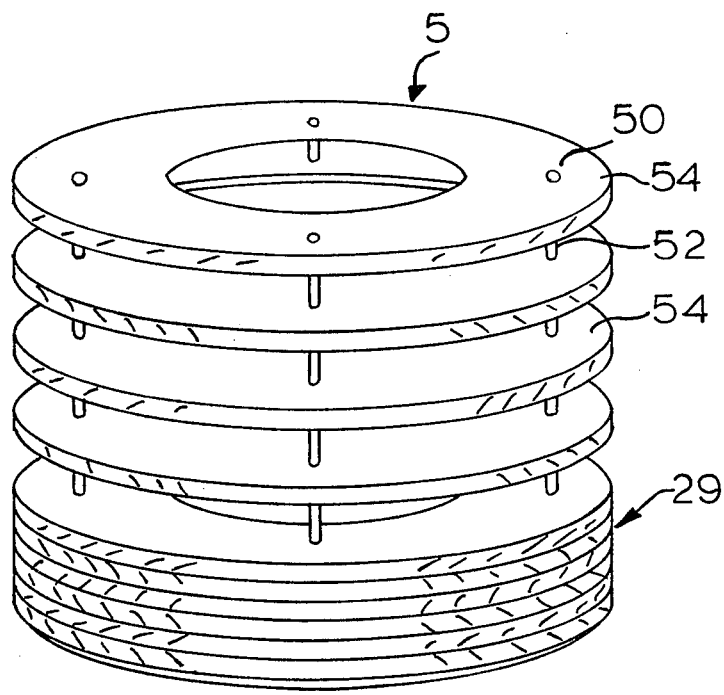
FIG. 7 is a perspective view of a fully assembled reef element of a second type attached to the type of base shown in FIG. 4.
Figure 8:
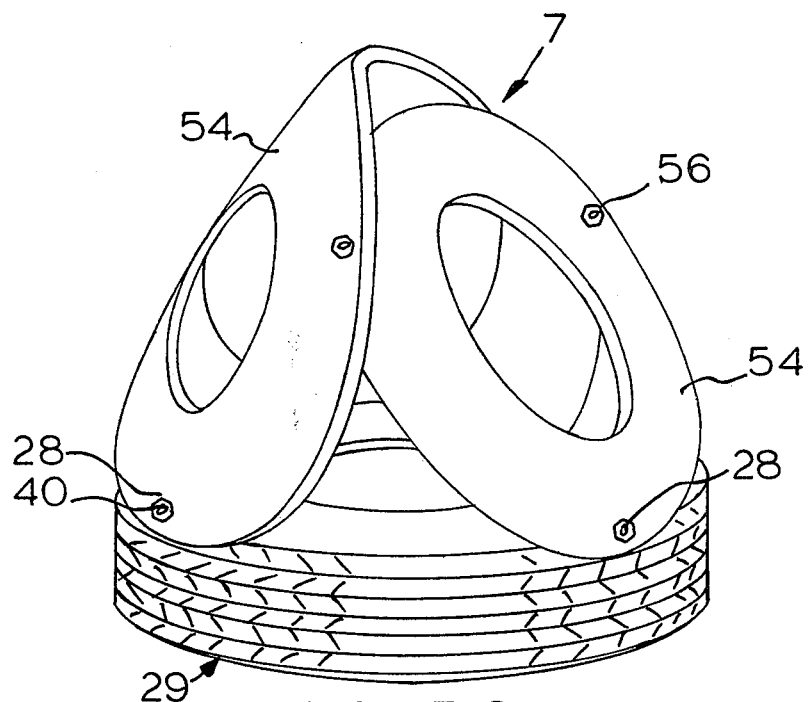
FIG. 8 is a perspective view of a fully assembled reef element of a third type attached to the type of base shown in FIG. 4.

Two other types of reef elements are represented in FIGS. 7 and 8. FIG. 7 shows a reef element 5 having a base 29 to which are attached sidewalls 54 which have been cut from tire casings and mounted with long bolts 50 with spacers 52 to maintain a selected amount of spacing between each of sidewalls 54. This type of reef element can also be mounted on a precast concrete base 23.

The third alternative type of reef element 7 of the present invention is shown in FIG. 8. In this configuration, three sidewalls 54 that have been cut from tire casings are fastened together with nuts and bolts 56 in an overlapping pyramidal shape as shown (however, any number of sidewalls 54 can be fastened to form a polyhedron in the overlapping manner shown). The pyramidal interconnection of sidewalls 54 is then fastened to base 29 with studs 28 and nuts 40. Although it is not shown here, the pyramidal interconnection of sidewalls 54 can be attached to base 29 with flexible attaching means 46 (FIG. 6), or mounted on base 23.

Enumerable other alternative types of reef elements of the present invention are possible by cutting tire casings or other suitable materials in any number of other ways. For example, a reef element which is similar to reef elements 1 and 3 can be constructed by making one continuous cut along the surface of the tread of a tire casing from one sidewall to the other as the tire is rotated several times (i.e., the cut is slightly offset, may 5°, from being perpendicular to the loci of points within the tire which are equidistant from the tread surface). This produces a multi-loop spiral that can then be attached to either base 23 or 29 in a longitudinally stretched form or in a circularly stretched form.

While the basic material used to fabricate each of the above-described reef elements has been tire casings, other materials can be used just as effectively. For example, the loop sections 14 in FIGS. 5 and 6 could be segments cut from a plastic tube or pipe with the selected inside diameter which can then be clamped together in the fanned-out fashion and attached to either of bases 23 or 29 in the manner discussed above. Inner tubes are another potential source. Also, heavy sheets of rubber or plastic can be used to form the ring sections of the reef elements shown in FIGS. 7 and 8.

It can be seen that by cutting tire casings and opening them up to form any of the three types of reef elements discussed above, or similar reef elements, that a single tire can be made to fill a larger volume of, and a larger areas on the bottom of, the ocean floor than one uncut tire can. Also, when these opened tire casing structures are attached to either of the bases discussed above, the entire reef element becomes self-righting when dropped overboard because of the low center of gravity at the base end. In addition, the low center of gravity created by the relatively heavier base makes the base an effective anchor for the reef element. Thus, each of the reef elements is considerably lighter in weight than the prior art reef elements, making it possible for an individual to handle each element alone, and to drop them overboard in the selected location without the need for expensive, heavy-duty handling equipment. The self-righting and self-anchoring features of these reef elements also make it possible to build a reef without the need of a diver to implace and anchor each reef element on the bottom.

Figure 9:
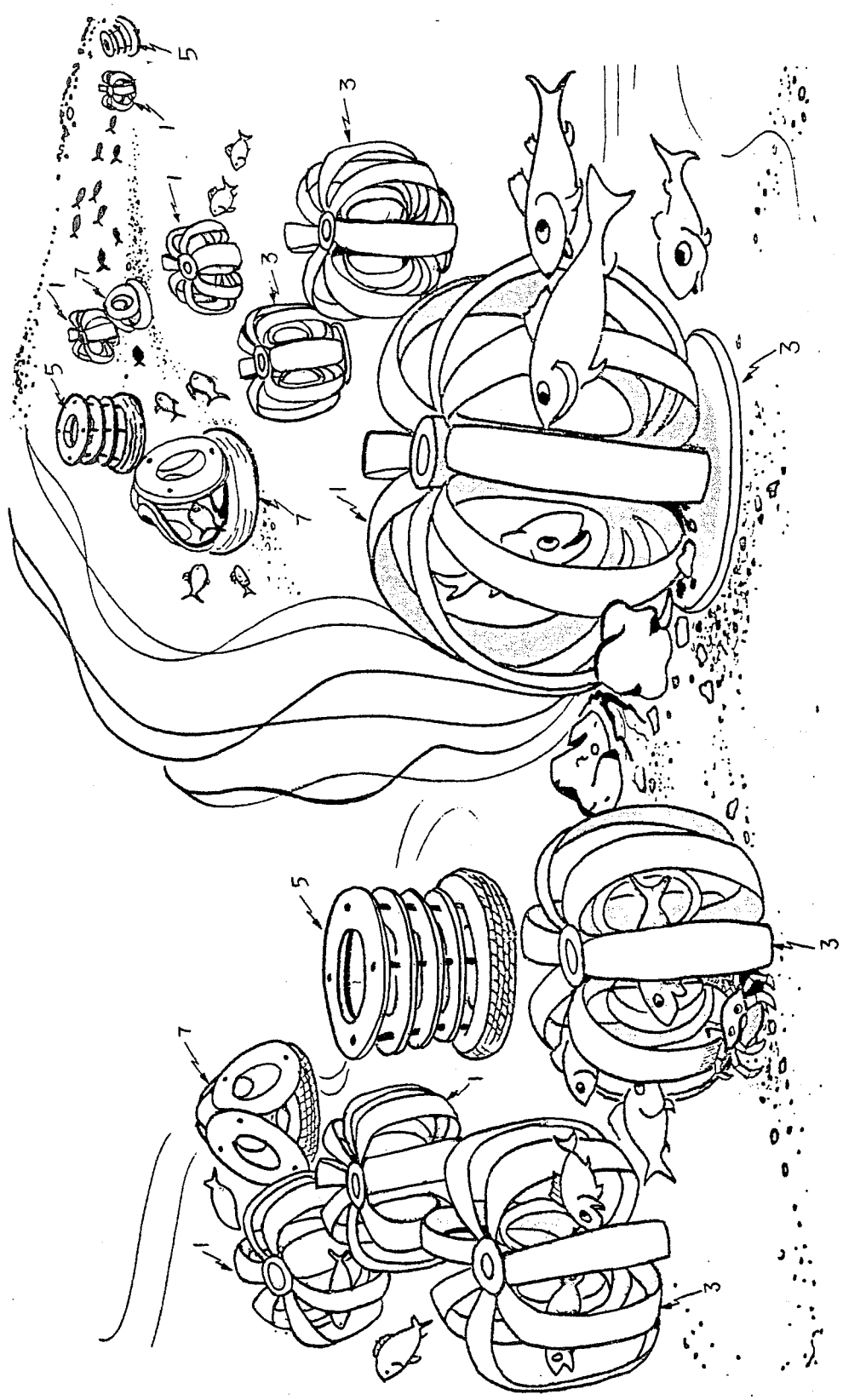
FIG. 9 shows a diagrammatic illustration of the interaction of numerous fish with a typical reef layout using the types of reef elements of the present invention.

In the diagrammatic illustration of FIG. 9, numerous fish are shown congregating and interacting with a collection of the various types of reef elements 1, 3, 5 and 7 discussed above. To form a reef as shown in FIG. 9, the individual reef elements can be dropped overboard by one person from a slowly moving boat or barge. The pattern which the overall reef will assume can be controlled by directing the boat or barge along the desired path and dropping reef elements 1, 3, 5 and 7 overboard in the desired order at selected intervals. In FIG. 9, it can be seen that the boat would have taken an S-shaped path while the individual reef elements were dropped overboard.

With a reef of this type, protection from larger fish is provided for each of a variety of sizes of fish from the small fry to the average market size. Small fry are best protected, for example, in reef element 3 by virtue of the smaller inner segments 14 and by reef element 5 by virtue of the narrow spaces between sidewalls 54. The fingerling size fish find protection within the larger protected area of each of reef elements 1, 3, 5 and 7. And, finally, the average market size fish can find protection within this type of reef from larger predators by dodging between the individual reef elements 1, 3, 5 and 7. Thus, it is clearly seen that the more reef elements which are used, the greater the protection for a still greater number of each size of fish.

I claim:

1. A method of manufacturing an artificial reef element, the method comprising the steps of:
    a. selecting tire casings as the material;
    b. cutting the tire casing longitudinally a plurality of times, each of said cuts being substantially perpendicular to the loci of points equidistant from the tread of the tire casing, said cuts also being substantially the same length as each other and ending at adjacent points along the tread of the tire casing forming a web section of the tread to hold the plurality of individual tire casing segments together;
    c. arranging and fastening the cut material into an open structured form that occupies a greater volume of space than the uncut material of step a; and
    d. mounting the cut material onto a base having a low center of gravity and which has a relative density that is substantially greater than the density of the selected material.

2. The method according to claim 1 wherein step c comprises the steps of:
    e. pulling the two cut end segments of a first tire casing away from the remainder of the cut segments in a clockwise and counter-clockwise direction, respectively, until the two cut end segments are juxtaposed to each other; and
    f. fastening the two juxtaposed end segments to each other.

3. The method according to claim 2 wherein step c further includes the steps of:
    nesting at least one additional cut tire casing with said first opened tire casing;
    pulling open and fastening the end segments of each additional tire casing as in steps e and f; and
    fastening each additional tire casing to every other tire casing.

4. The method according to claim 2 wherein step c comprises the steps of:
    g. placing at least two similarly cut tire casings side by side each with its web section adjacent to that of the others;
    h. fastening together each pair of cut end segments which are juxtaposed one to the other to form a first multi-tire casing string;
    i. pulling the end most cut end segments of the two end most tire casings of the string away from the remainder of the cut segments in a clockwise and counterclockwise direction, respectively, until the two cut end setments are juxtaposed to each other; and
    j. fastening these two juxtaposed cut end segments to each other.

5. The method according to claim 4 wherein step c further includes the steps of:
    n. preparing at least one additional multi-tire casing string as in steps g and h;
    o. nesting said at least one additional multi-tire casing string with said first multi-tire casing string;
    p. pulling open and fastening the end segments of each of said at least one additional multi-tire casing string as stated in steps i and j; and
    q. fastening each additional multi-tire casing string to every other multi-tire casing string.

6. An artificial reef element comprising:
    fish protection means, configured for providing restricted spaces in which smaller fish may seek shelter from their larger predators, constructed from a material selected to be resistant to deterioration under water and by cutting and arranging the material into a configuration which occupies a greater volume of space than that occupied by the material prior to being cut;
    a tire casing;
    flexible attaching means;
    at least one precast concrete weight placed within the portion of the tire casing formed by its tread and sidewall portions;
    said precast concrete weights having cast therein a first portion of the flexible attaching means;
    a second portion of the flexible attaching means extending from within said concrete weight for holding the weights in place by fastening the second portion of this means around the water surface of the sidewalls and tread portions of the casing; and
    attachment means for fastening the fish protection means to the tire casing.

7. The artificial reef element as in claim 6 wherein the fish protection means comprises:
    a plurality of washer-shaped means arranged in a continuous ring with a portion of each washer-shaped means overlapping each of the next adjacent washer-shaped means; and
    a fastening means for attaching each washer-shaped means to the next adjacent washer-shaped means at the overlapping portion of each.

8. The artificial reef element as in claim 6 wherein the fish protection means comprises:
    a first plurality of loop segment means; and
    first fastening means for holding each of said first plurality of loop segment means in a star-shaped pattern with each of said loop segment means being juxtaposed to each other in the central region of the star-shaped structure and being increasingly spaced-apart from each other as each extends out from the central region of the star-shaped structure.

9. The artificial reef element as in claim 8 wherein the fish protection means further comprises:
    at least one additional plurality of loop segment means;
    second fastening means for holding each of said additional plurality of loop segment means in a star-shaped structure in a manner similar to that in which said first fastening means holds said first plurality of loop segment means, each of said additional plurality of loop segment means being nested within the first plurality of loop segment means; and third fastening means for attaching each of the additional plurality of loop segment means to the first plurality of loop segment means.

10. An artificial reef element comprising:

fish protection means, configured for providing restricted spaces in which smaller fish may seek shelter from their larger predators, constructed from a material selected to be resistant to deterioration under water and by cutting and arranging the material into a configuration which occupies a greater volume of space than that occupied by the material prior to being cut;

a precast concrete base means having a thin-walled, hollow tubular section with a broad flange at the one end thereof; and attachment means for fastening the fish protection means to the precast concrete base means.

* * * * *